(12) United States Patent
Park (10) Patent No.: US 6,898,079 B2
(45) Date of Patent: May 24, 2005

(54) DOCKING STATION AND NOTEBOOK COMPUTER USING THE SAME

(75) Inventor: Woonam Park, Yongin (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 149 days.

(21) Appl. No.: 10/374,722

(22) Filed: Feb. 27, 2003

(65) Prior Publication Data

US 2004/0075980 A1 Apr. 22, 2004

(30) Foreign Application Priority Data

Oct. 16, 2002 (KR) .................................. 10-2002-0063222

(51) Int. Cl.$^7$ ................................................ G06F 1/16
(52) U.S. Cl. ........................ 361/686; 361/683; 439/135; D14/300; 70/58
(58) Field of Search ................................ 361/683–686; 710/303, 304; 439/135–147; 70/57, 58; D14/300–434

(56) References Cited

U.S. PATENT DOCUMENTS

| | | | |
|---|---|---|---|
| 5,283,714 A | | 2/1994 | Tsai et al. |
| 5,535,093 A | * | 7/1996 | Noguchi et al. ............ 361/686 |
| 5,619,398 A | * | 4/1997 | Harrison et al. ............ 361/686 |
| 5,737,541 A | * | 4/1998 | Shimizu et al. ............ 710/303 |
| 5,870,283 A | * | 2/1999 | Maeda et al. ............... 361/686 |
| 5,959,835 A | * | 9/1999 | Dohi et al. .................. 361/686 |
| 6,093,039 A | * | 7/2000 | Lord ............................ 361/686 |
| 6,135,801 A | * | 10/2000 | Helot et al. ................. 439/341 |
| 6,236,571 B1 | * | 5/2001 | Dohi et al. .................. 361/686 |
| 6,275,378 B1 | * | 8/2001 | Lee et al. .................... 361/686 |
| 6,331,934 B1 | * | 12/2001 | Helot et al. ................. 361/686 |
| 6,570,758 B1 | * | 5/2003 | Maeda ........................ 361/686 |
| 6,744,627 B2 | * | 6/2004 | Won et al. ................... 361/686 |

FOREIGN PATENT DOCUMENTS

| | | |
|---|---|---|
| JP | 6-12145 | 1/1994 |
| JP | 7-20971 | 1/1995 |
| JP | 9-269848 | 10/1997 |
| JP | 2001-67141 | 3/2001 |
| KR | 0163879 | 9/1998 |
| KR | 2000-13581 | 7/2000 |
| KR | 2001-47737 | 6/2001 |
| KR | 2002-5130 | 1/2002 |

* cited by examiner

*Primary Examiner*—Lisa Lea-Edmonds
(74) *Attorney, Agent, or Firm*—Staas & Halsey LLP (57) ABSTRACT

A docking station is detachably installed to a computer body and cooperates with the computer body, including a case, a pair of detachable parts disposed in opposite sides of the case to allow the case to be coupled to or detached from the computer body, a link slidably installed in the case and sliding in contact with the pair of detachable parts, and a rotating part rotatably coupled to the case and adhering closely to one end part of the link to slide the link. Thus, a docking station allows the computer body to be detachably coupled with the docking station by only one lever and a notebook computer using the same.

41 Claims, 7 Drawing Sheets

DOCKING STATION AND NOTEBOOK COMPUTER USING THE SAME

CROSS-REFERENCE TO RELATED APPLICATIONS

This application claims the benefit of Korean Application No. 2002-63222, filed Oct. 16, 2002, in the Korean Intellectual Property Office, the disclosure of which is incorporated herein by reference.

BACKGROUND OF THE INVENTION

1. Field of the Invention

The present invention relates to a docking station and a notebook computer using the same, and more particularly, to a docking station allowing a computer body to be detachably coupled with the docking station by only one lever and a notebook computer using the same.

2. Description of the Related Art

A docking station generally indicates a hardware frame and a series of interfaces for electrical connection, with which functions of a notebook computer can be executed effectively like a desktop computer. These interfaces typically allow the notebook computer to communicate with a local printer, large-capacity storage devices or backup drives, and other devices, which are separately provided to a notebook computer. The docking station may further include a network interface card (NIC) with which the notebook computer is allowed to access to a local area network (LAN). Variations of the docking station include a port extending device, a device that extends the number of ports that can be used in a notebook computer, and a storage-expanding device holding therein a CD-ROM drive, a floppy disk drive, and additional storage units.

Recently, users prefer notebook computers whose bodies are slim. Coping with such preference by users, notebook computers whose main bodies can be connected with docking stations have recently been in demand.

A conventional docking station has the following configuration. A pair of detachable parts to be coupled to and detached from the lower plate of a computer body are provided in both sides of the docking station. Levers are rotatably coupled to an end part of each detachable part and the detachable parts are coupled to and detached from the lower part of the computer body according to a rotation of the levers. Also, the detachable parts have a configuration to be fixed by a lock, such as a Kensington lock, so that the detachable parts are secured, even when the computer body is not mounted on the docking station, as the Kensington lock is not separated from the docking station.

Accordingly, when separating the docking station from the computer body, the levers have to be gripped and rotated by both hands, and the docking station is separated from the computer body only after the detachable parts coupled to the lower part of the computer body are detached from the lower part of the computer body.

But a problem arises because the levers need to be simultaneously rotated by both hands to separate the conventional docking station from the computer body. Thus, the coupling/detachment of the computer body and the conventional docking station can be annoying.

Also, if a lock, such as the Kensington lock, is installed in the docking station to prevent the docking station from being lost or stolen, there is another problem in that the computer body may be difficult to mount on the docking station because the detachable parts are fixed by the Kensington lock.

SUMMARY OF THE INVENTION

Accordingly, it is an aspect of the present invention to provide a docking station allowing a computer body to be coupled detachably with the docking station by only one lever and a notebook computer using the docking station.

According to an aspect of the invention, a docking station detachably installed in a computer body and cooperating with the computer body, comprises a case; a pair of detachable parts disposed in opposite sides of the case and allowing the case to be coupled to or detached from the computer body; a link slidably installed in the case and sliding in contact with the pair of detachable parts; and a rotating part rotatably coupled to the case and adhering closely to one end part of the link to slide the link.

The foregoing and/or other aspects of the present invention are achieved by providing a docking station allowing a computer body and the docking station to be fastened to prevent theft or loss by a Kensington lock, wherein the computer body may be mounted on the docking station even if the docking station is locked by the Kensington lock, and a notebook computer using the docking station.

In one aspect, the detachable part comprises a lift part ascending/descending to press/release from the computer body, according to a sliding of the link; and a holder part moving forward and backward to be coupled to and uncoupled from the computer body, according to the sliding of the link.

In an aspect, the link comprises a pair of lift slopes inclined along the sliding direction of the link and slidably contacting with the lift parts so that the lift parts can ascend and descend; and a pair of holder slopes inclined across the sliding direction of the link and slidably contacting the holder parts so that the holder parts can move forward and backward.

In an aspect, the holder part comprises a rod to move forward and backward, adhering closely to the holder slope, a hook bent from an end part of the rod to be extended and coupled to and uncoupled from the computer body, and an auxiliary spring elastically biasing the rod, wherein one end part of the auxiliary spring is supported by the rod and the other end part thereof is supported by one side of the case.

In an aspect, the rotating part comprises a rotation shaft and a lever rotatably coupled to the rotation shaft and adhering closely to an end of the link to slide the link.

In an aspect, the docking station further comprises a lock hole provided in the case and allowing a lock member of a Kensington lock to enter and exit the lock hole; and a rib extended from one side of the link toward the lock hole and opening/closing the lock hole according to the sliding of the link, so that a computer body and the docking station are fastened, to prevent theft or loss by a Kensington lock.

According to another aspect of the invention, the present invention is achieved by providing] a notebook computer having a computer body together with a docking station detachably mounted on the computer body and cooperating with the computer body, wherein the docking station comprises a case, a pair of detachable parts disposed in opposite sides of the case and allowing the case to be coupled to or detached from the computer body, a link slidably installed in the case and sliding in contact with the pair of detachable parts, and a rotating part rotatably coupled to the case and adhering closely to one end part of the link to slide the link.

In one aspect, a notebook computer further comprises a Kensington lock having a lock member, a lock hole provided in the case and allowing the lock member of the Kensington lock to enter and exit, and a rib extended from one side of the link toward the lock hole and opening/closing the lock hole according to the sliding of the link, so that a computer body and the docking station are fastened to prevent theft or loss by a lock, for example, a Kensington lock.

In an aspect, the detachable part comprises a lift part ascending/descending to press/release from the computer body according to a sliding of the link; and a holder part moving forward and backward to be coupled to and uncoupled from the computer body according to the sliding of the link.

In an aspect, the link comprises a pair of lift slopes inclined along the sliding direction of the link and slidably contacting with the lift parts so that the lift parts can ascend and descend; and a pair of holder slopes inclined across the sliding direction of the link and slidably contacting with the holder parts so that the holder parts can move forward and backward.

In an aspect, a holder part comprises a rod to move forward and backward, adhering closely to the holder slope; a hook bent from an end part of the rod to be extended and coupled to and uncoupled from the computer body; and an auxiliary spring elastically biasing the rod, wherein one end part of the auxiliary spring is supported by the rod and the other end part thereof is supported by one side of the case.

In an aspect, a rotating part comprises a rotation shaft; and a lever rotatably coupled to the rotation shaft and adhering closely to an end of the link to slide the link.

In an aspect, when the computer body is mounted on the docking station with the docking station locked by a lock, the hook slides by an elastic force of the auxiliary spring, so that the computer body is mounted on the docking station.

BRIEF DESCRIPTION OF THE DRAWINGS

These and/or other aspects and advantages of the present invention will become apparent and more readily appreciated from the following description of preferred embodiments, taken in conjunction with the accompanying drawings of which.

DETAILED DESCRIPTION OF THE PREFERRED EMBODIMENTS

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Figure 1:
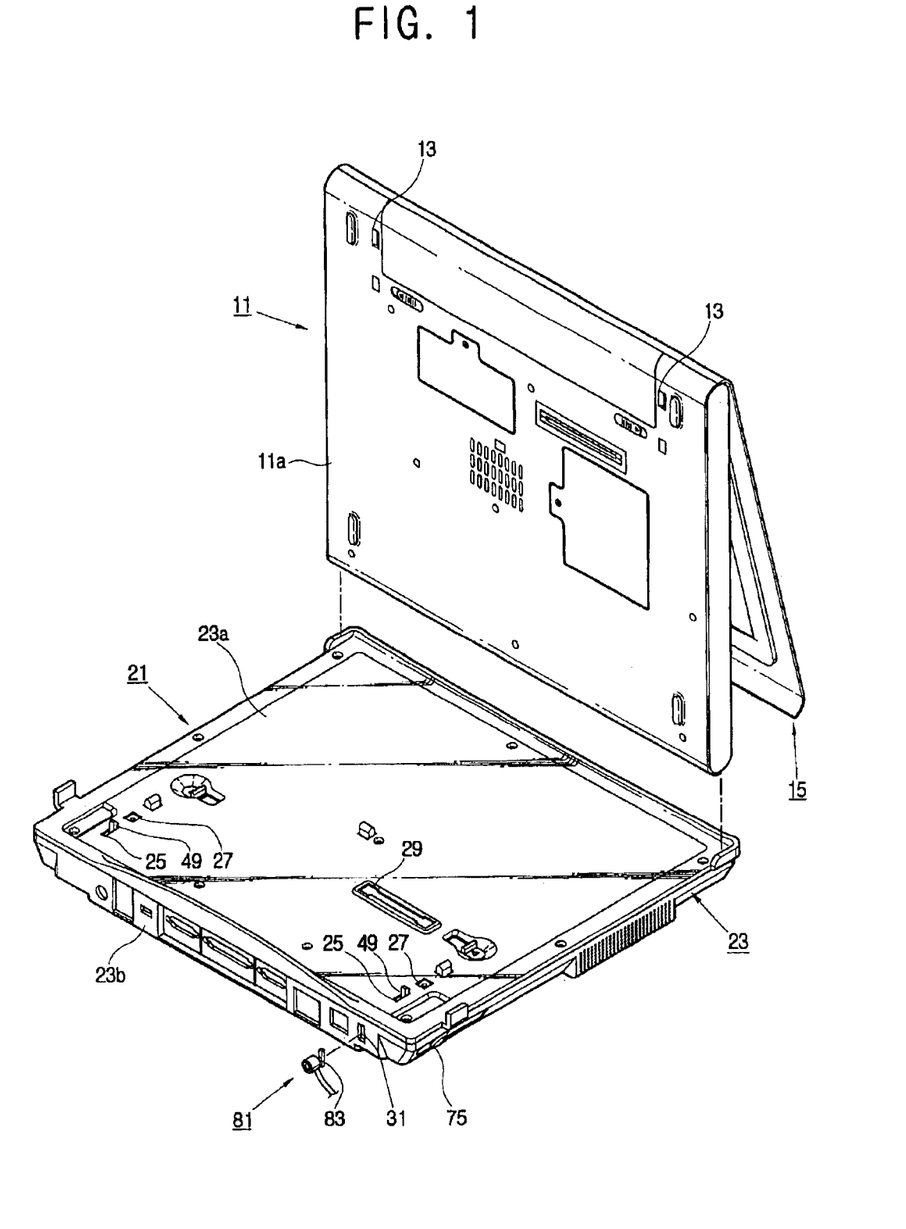
FIG. 1 is a perspective view illustrating a computer body and a docking station of a notebook computer according to an embodiment of the present invention.
Figure 2:
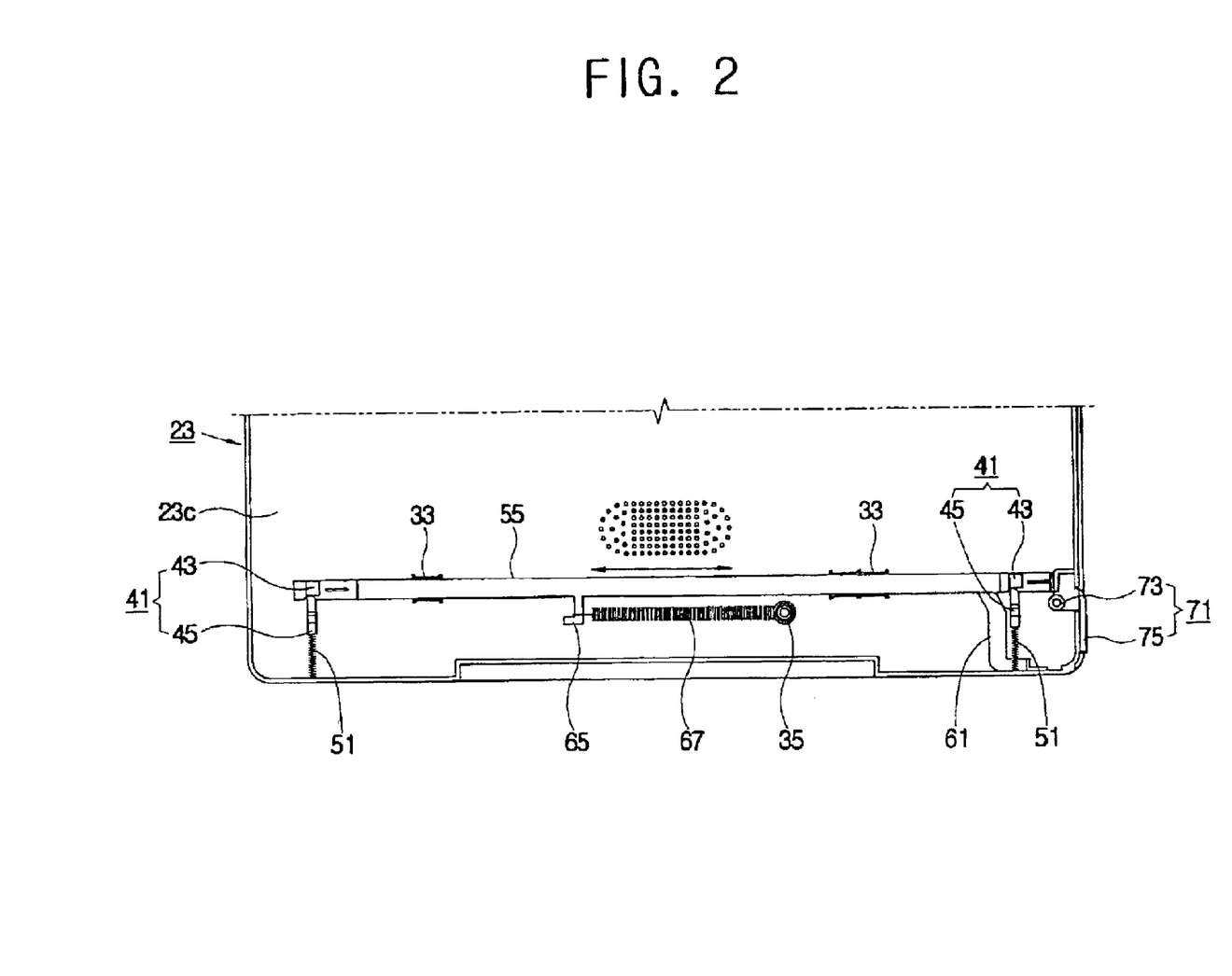
FIG. 2 is a top plan view partially illustrating an inner part of the docking station of FIG. 1.
Figure 3:
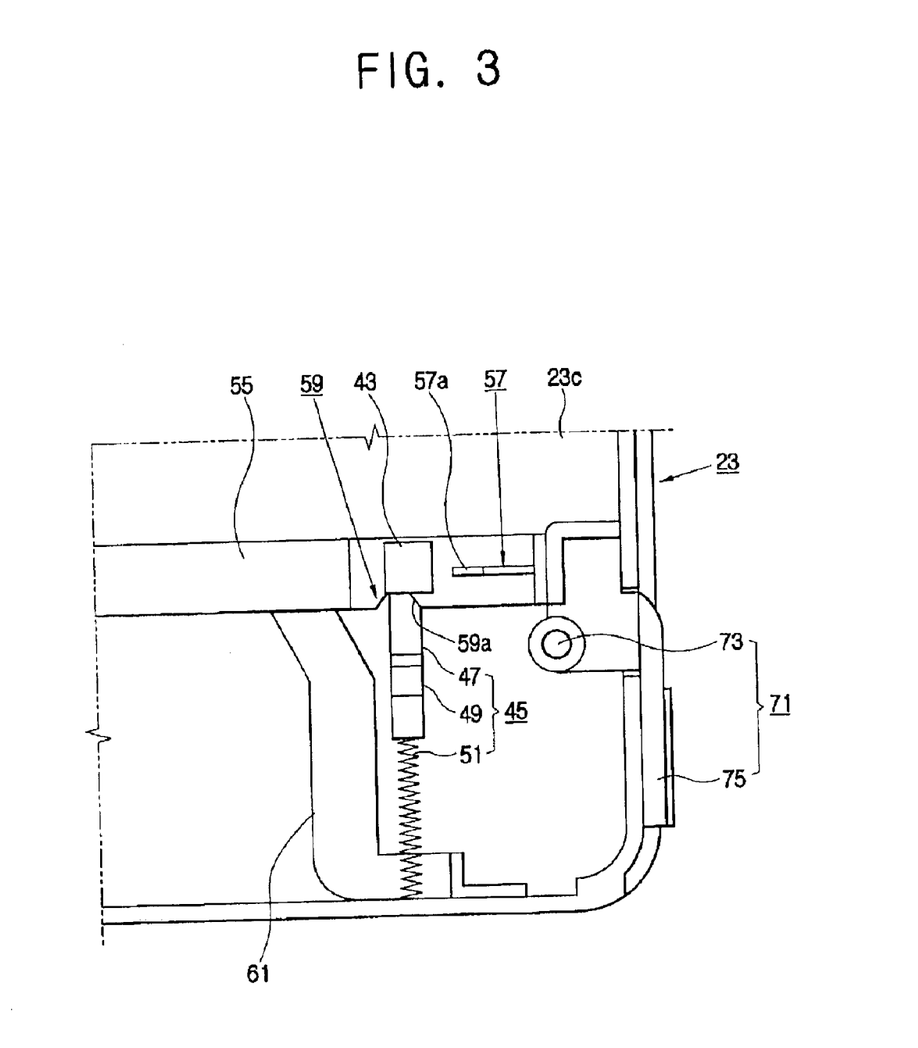
FIG. 3 is an enlarged view illustrating a main portion of FIG. 2.

FIG. 1 is a perspective view illustrating a computer body and a docking station of a notebook computer according to the present invention, FIG. 2 is a top plan view partially illustrating an inner part of the docking station of FIG. 1 and FIG. 3 is an enlarged view illustrating a main portion of FIG. 2. As shown in FIGS. 1 through 3, a notebook computer according to an embodiment of the present invention is comprised of a computer body 11 equipped with a central processing unit (CPU), a display part 15 receiving a picture signal generated from the computer body 11 and displaying it thereon, a docking station 21 detachably installed on a lower part of the computer body 11 and cooperating with the computer body 11. Also, the notebook computer according to the present invention further comprises a lock 81, such as, by way of example only, a Kensington lock, coupled to the docking station 21 to prevent the docking station 21 and the computer body 11 from being lost or stolen. Other types of locks may be usable as well. Herein, the Kensington lock 81 is selectively applied to the notebook according to the present embodiment.

In the computer body 11 are provided a keyboard part and a touch pad (not shown) that are used to transmit an input signal into the computer body 11. On the lower plate 11a of the computer body 11 there are a pair of hook grooves 13 allowing hooks 49 of a holder part 45 (see FIGS. 4A and 4B), to be described below, to be inserted into, or released from, the corresponding hook grooves 13.

The docking station 21 comprises a case 23, a pair of detachable parts 41 allowing the case to be coupled to or detached from the computer body 11, a link 55 slidably installed in the case 23 to slide in contact with the pair of detachable parts 41 and a rotating part 71 to slide the link 55.

The case 23 has a rectangular box shape. On opposite sides of a top plate 23a of the case 23 is formed a pair of hook-passing holes 25 through which the hooks 49 of the holder part 45 pass. A pair of lift-passing holes 27 is formed adjacent to the hook-passing holes 25, through which lift parts 43 (to be described later) pass. On the top plate 23a of the case 23 is also provided an interface part 29 receiving and transmitting data between the docking station 21 and the computer body 11. The open lock hole 31 is formed on the front plate 23b of the case 23, through which a lock member 83 (to be described later) of the Kensington lock 81 passes. In an inner part 23c of the case 23 is provided a plurality of guides 33 guiding the sliding of the link 55. Each guide 33 is disposed along the lengthwise direction of the link 55. Also provided in the inner part 23c of the case 23 is a spring supporter 35. A spring 67 (to be described later) is coupled to both the spring supporter 35 and the link 55.

The detachable parts 41 comprise a pair of lift parts 43 and a pair of holder parts 45. The pair of lift parts 43 are disposed on opposite sides of the inner part 23c of the case 23 and ascend or descend according to the sliding of the link 55, to thereby press on or release from the lower plate 11a of the computer body 11. The pair of holder parts 45 move forward and backward according to the sliding of the link 55, to thereby be coupled to and uncoupled from the lower plate 11a of the computer body 11.

Each lift part 43 has a rod shape and abuts a lift slope 57 (to be described later) of the link 55. The lower part of the lift part 43 has a predetermined slope 57a corresponding to the lift slope 57 and accordingly the lift part 43 ascends relative to the lower plate 11a of the computer body 11 along the lift slope 57, sliding in contact with the lift slope 57, according to the sliding of the link 55. Also, the upper part of the lift part 43 is supported to be able to ascend through the lift-passing holes 27 of the case 23.

Each holder part 45 comprises a rod 47, to move forward and backward with one end part thereof abutting a holder slope 59, and a hook 49 bent from an end part of the rod to be extended and coupled to and uncoupled from the hook groove 13 of the lower plate 11a of the computer body 11. The hook 49 is supported to be able to slide in the hook-passing hole 25. In the other end part of the rod 47, an auxiliary spring 51 elastically biases the rod to an original frontward position. One end part of the auxiliary spring 51 is supported by the rod 47 and the other end part is supported by the inside of the front plate 23b of the case 23 not to interfere with the rib 61 (to be described later) of the link 55. Accordingly, the rod 47 of the holder part 45 always contacts the holder slope 59 of the link 55, and slides along the holder slope 59 according to the sliding of the link 55. The rod 47 moves forward or backward along the holder slope 59 relative to the front plate 23b of the case 23, so that the hook 49 is coupled to or uncoupled from the hook groove 13. Also, the hooks 49 can slide along the hook-passing holes 25 of the case 23 by the elastic force of the auxiliary spring 51, so that the computer body 11 is mounted onto the docking station 21 while the docking station 21 is locked by the Kensington lock 81 (to be described later).

The link 55 has a rod shape and is installed slidably as shown by an arrow in FIG. 2. The lift slopes 57, with which the lift part 43 slidingly contacts, are located on opposite sides of the link. The lift slope 57 protrudes from the plate of the link 55 along the lengthwise direction thereof. The lift slope 57 has a slope 57a ascending toward the lever 75 of the rotating part 71 (to be described later). If the link 55 slides to the left of the arrow in FIG. 2, the lift part 43 slidingly ascends along the slope 57a of the lift slope 57 toward the lower plate 11a of the computer body 11 to press the lower plate 11a of the computer body 11. Conversely, if the link 55 slides to the right of the arrow in FIG. 2, the lift part 43 descends relative to the lower plate 11a of the computer body 11 to release from the lower plate 11a of the computer body 11.

In a part adjacent to each lift slope 57 of the link 55 is provided the holder slope 59 with which the rod 47 of the holder part 45 slidingly contacts. The holder slope 59 is partially cut from the plate of the link 55 across the lengthwise direction, that is, toward the front plate 23b of the case 23. The holder slope 59 has a slope 59a inclined toward a rear plate of the case 23. If the link 55 slides to the left of the arrow of FIG. 2, the rod 47 of the holder part 45 slides along the slope 59a of the holder slope 59 toward the front plate 23b of the case 23 to unlock the hook 49 of the holder part 45 from the hook groove 13. Similarly, if the link 55 slides to the right of the arrow in FIG. 2, the rod 47 of the holder part 45 slidingly retreats from the front plate 23b along the slope 59a of the holder slope 59 by the elastic force of the auxiliary spring 51 to lock the hook 49 of the holder part 45 to the hook groove 13.

Also, the rib 61 is extended into the link 55 to open/close the lock hole 31 of the case 23 according to the sliding of the link 55. In the free end of the rib 61, an accommodation hole 63 is formed to accommodate the lock member 83 of the Kensington lock 81. If the lock member 83 of the Kensington lock 81 is accommodated in the accommodation hole 63, the sliding of the link 55 is not only restricted, but also the computer body 11 and the docking station 21 are locked.

In the middle part of the link 55 is a spring joint part 65 coupled to the spring 67. The spring 67 connects the spring supporter 35 of the case 23 with the spring joint part 65 and elastically biases the lever 75 rotated to separate the computer body 11 from the docking station 21, to restore an original position of the lever 75.

The rotating part 71, rotatably coupled to the case 23 and sliding the link 55 is located in one end part of the link 55. The rotating part 71 includes a rotation shaft 73 and the lever 75 sliding along the link 55.

The rotation shaft 73 has a bar shape and is installed in an upright position in the inner part 23c of the case 23. To the rotation shaft 73 is rotatably coupled the lever 75. One part of the lever 75 abuts an end part of the link 55, and the other part thereof is protruded from a side part of the case 23, to be gripped by a user.

The lock member 83 of the Kensington lock 81 that is used to prevent the docking station 21 and the computer body 11 from being stolen or lost is accommodated in, and is coupled to, the lock hole 31 of the case 23 and the accommodation hole 63 of the rib 61, so that the sliding of the link 55 is restricted to locking/unlocking the computer body 11 and the docking station 21.

Also, although not shown, within the rear of the docking station 21 are installed peripheral devices such as a CD-ROM drive and a floppy disk drive, and in the rear plate of the case 23 are openings through which CDs and floppy disks are inserted.

With this configuration, it is described below how the computer body is mounted on or separated from the docking station according to the present invention.

Figure 4A:
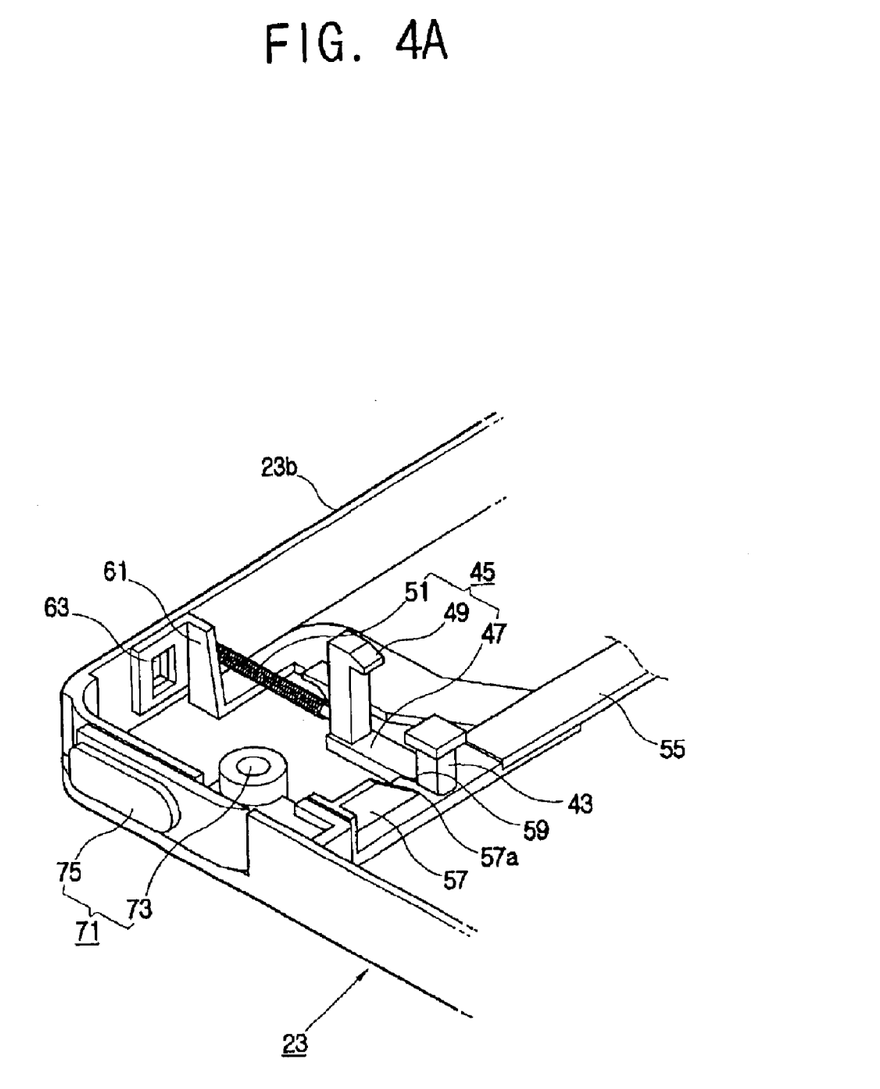
FIGS. 4A and 4B are views illustrating a configuration and an operation state of a detachable part and a rotating part of FIG. 2.
Figure 4B:
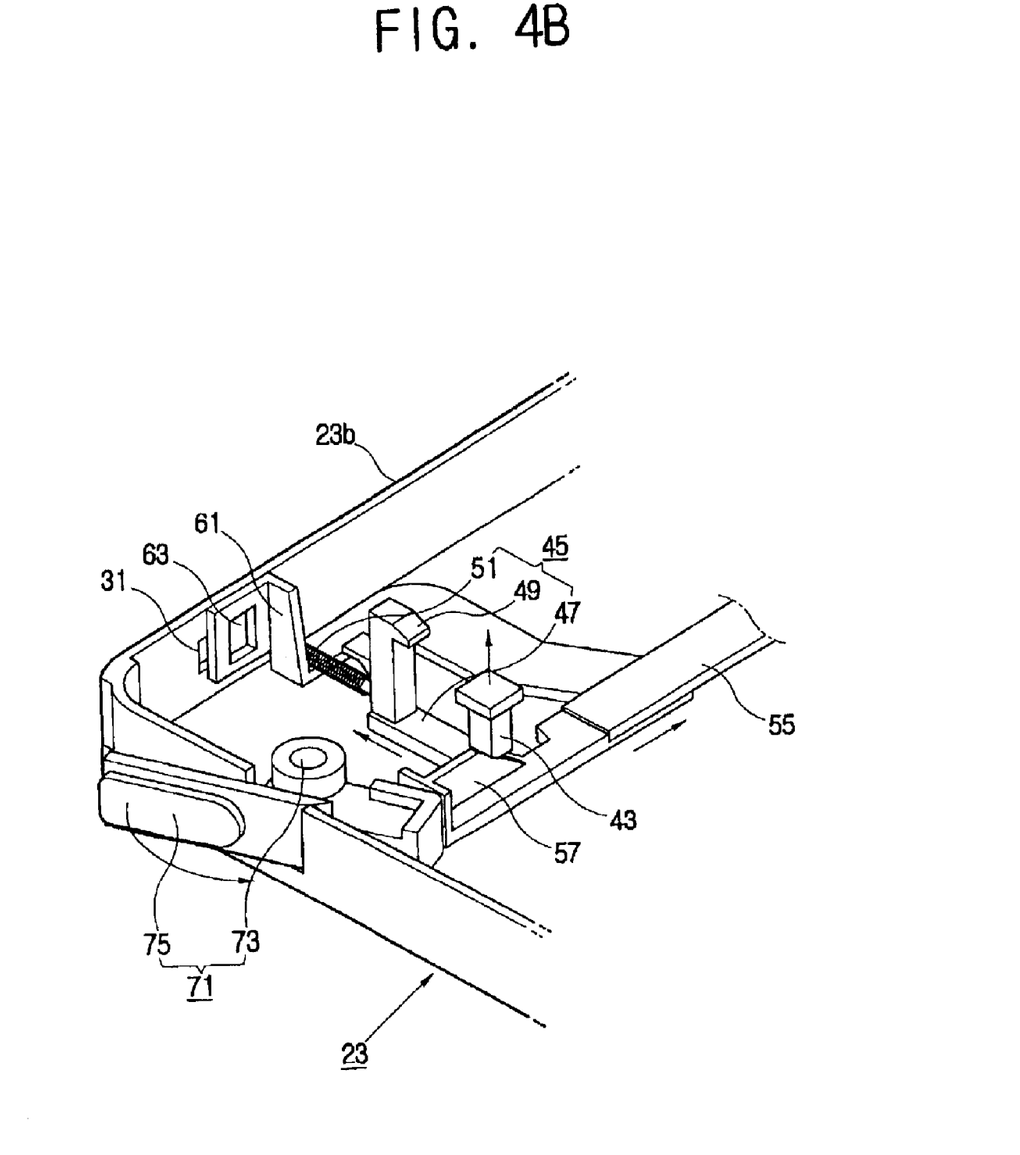
Figure 5:
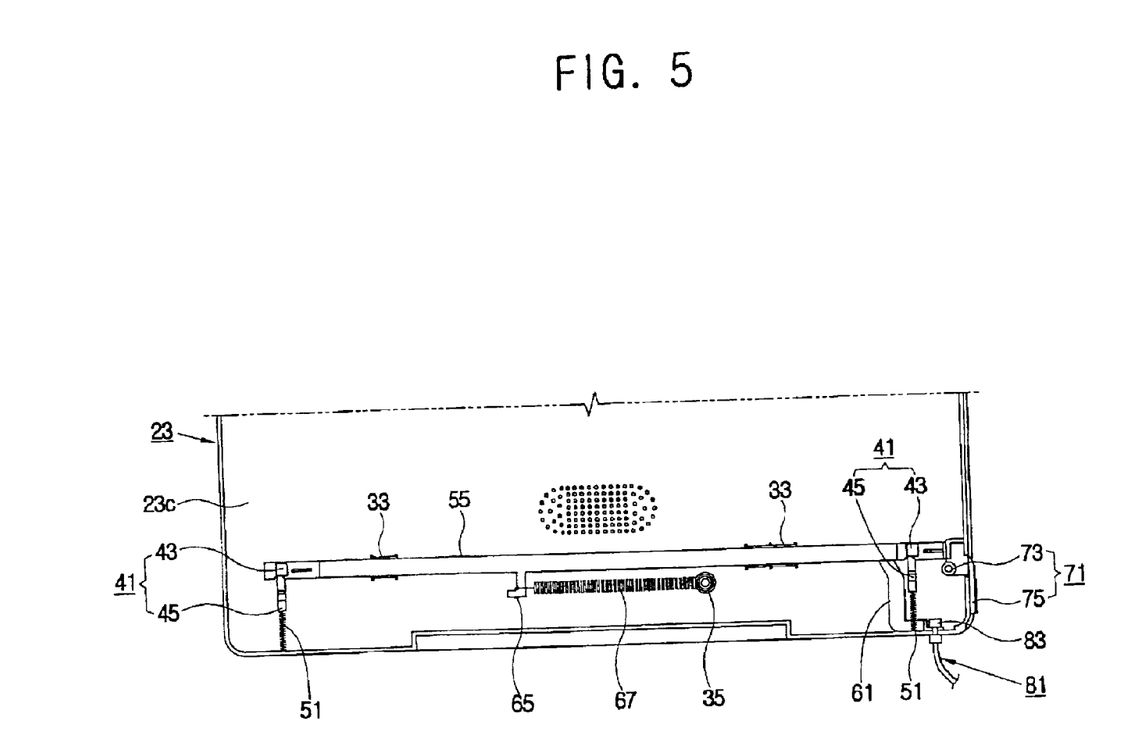
FIG. 5 is a top plan view partially showing an inner part of the docking station and illustrating a locking state of the docking station.

After the lock member 83 of the Kensington lock 81, accommodated in and coupled to the lock hole 31 of the case 23 and the accommodation hole 63 of the rib 61, is unlocked as shown in FIG. 5, the lock member 83 of the Kensington lock 81 is separated from the lock hole 31 of the case 23 and the accommodation hole 63 of the rib 61 as shown in FIG. 4A. As shown in FIG. 4B, if the lever 75 of the rotating part 71 is rotated counterclockwise, the link 55 slides to the left and the lift part 43 slidingly ascends along the slope 57a of the lift slope 57 of the link 55 and accordingly contacts the lower plate 11a of the computer body 11 to press the lower plate 11a of the computer body 11. At the same time, the rod 47 of the holder part 45 slides along the slope 59a of the holder slope 59 of the link 55 to advance toward the front plate 23b of the case 23, and simultaneously, the hook 49 also advances to be unlocked from the hook groove 13 of the computer body 11. Thus, by using only one lever 75, a separation of the computer body and the docking station 21 is performed conveniently.

In the meantime, after the computer body 11 and the docking station 21 are separated, if the rotated lever 75 is not gripped, the link 55 slides to the right of the case 23 by an elastic force of the spring 67, and the lever 75 abutting one end part of the link 55 is rotated clockwise by the sliding of the link 55, returning the lever 75 to the original position. As the link 55 slides to the right of the case 23, the lift part 43 slidingly descends along the slope 57a of the lift slope 57, slides off the lower plate 11a of the computer body 11 and cannot press the lower plate 11a of the computer body 11. At the same time, by the elastic force of the auxiliary spring 51, the rod 47 of the holder 45 abuts the holder slope 59 of the link 55 and returns to its original position. Also, the hook 49 simultaneously recedes from the front plate 23b of the case 23.

After the lock member 83 of the Kensington lock 81 is accommodated in and coupled to the lock hole 31 of the case 23 and the accommodation hole 63 of the rib 61, when the computer body 11 is to be mounted on the docking station 21 with the docking station 21 locked by the Kensington lock 81, the hook 49 of the holder part 45 slides along the hook-passing hole 25 by the elastic force of the auxiliary spring 51 such that the computer body is mounted on the docking station even when the docking station 21 is locked by the Kensington lock 81. Because the sliding of the link 55 is limited by the lock member 83 of the Kensington lock 81 when the computer body 11 is mounted on the docking station 21 by a Kensington lock 81, the computer body 11 and the docking station 21 are locked and are prevented from being stolen or lost.

In one embodiment, the docking station case comprises: a rotatable part, rotatably coupled to the docking station case and abutting an automatic hooking unit; and the automatic hooking unit, arranged to hook/unhook a bottom of a computer body upon rotation of the rotatable part. The automatic hooking unit typically comprises: a pair of detachable parts, opposite one another inside the docking station case; and a slidable link, located between the detachable parts and parallel to a side of the docking station case, to move the detachable parts to hook/unhook the bottom of the computer body.

Figure 6:
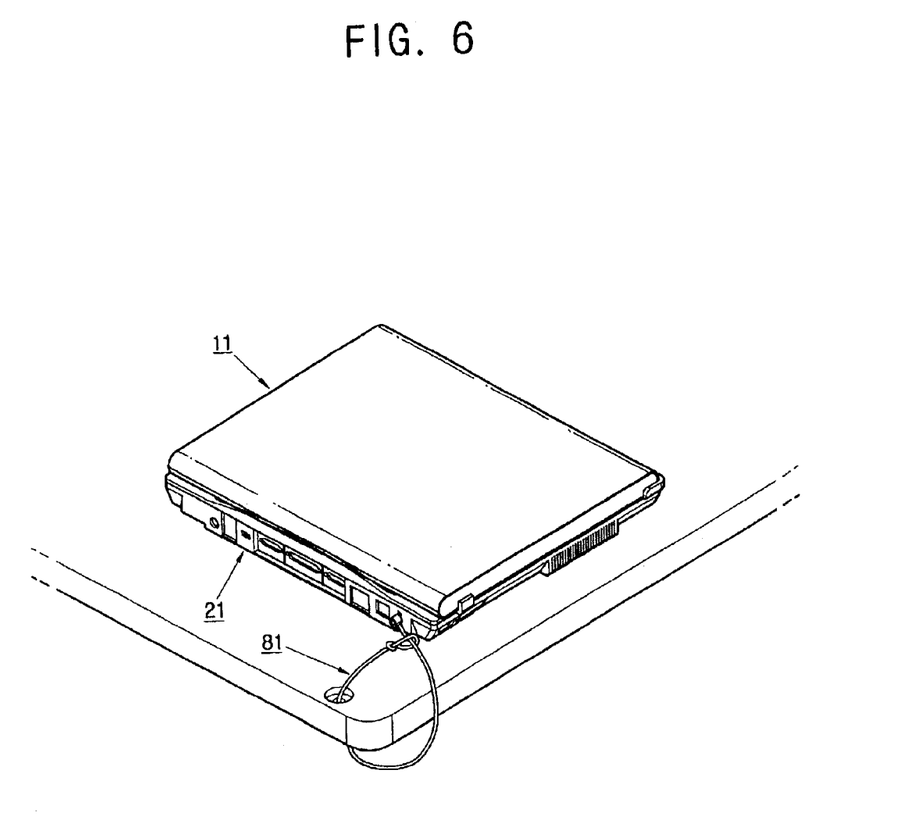
FIG. 6 is a view illustrating a state that the computer body and the docking station are fastened to a table by a Kensington lock, by way of example.

FIG. 6 is a view illustrating a state that the computer body 11 and the docking station 21 are fastened to a table by a Kensington lock 81, by way of example.

Accordingly, by operating the detachable part 41 provided in the docking station 21 and coupled to/detached from the computer body 11, the computer body 11 is coupled detachably with the docking station 21. Also, by a Kensington lock 81, for example, the Kensington lock, the computer body 11 and the docking station 21 are locked and are prevented from being stolen or lost and the computer body 11 can be mounted on the docking station 21 even when the docking station 21 is locked by the Kensington lock 81.

As described above, the present invention provides a docking station allowing a computer body to be coupled detachably with the docking station by only one lever and a notebook computer using the docking station. Also, the present invention provides a docking station allowing a computer body and the docking station to be fastened to be prevented from being stolen or lost by a lock, such as a Kensington lock, the computer body to be mounted on the docking station even when the docking station is locked by the Kensington lock, and a notebook computer using the docking station.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A docking station detachably installed to a computer body and cooperating with the computer body, comprising:
   a case;
   a pair of detachable parts disposed in opposite sides of the case and allowing the case to be coupled to or detached from the computer body;
   a link slidably installed in the case and sliding in contact with the pair of detachable parts; and
   a rotating part rotatably coupled to the case and abutting one end part of the link to slide the link.

2. The docking station according to claim 1, wherein each of the detachable parts comprises:
   a lift part ascending/descending to press/release from the computer body, according to a sliding of the link; and
   a holder part moving forward and backward to be coupled to and uncoupled from the computer body, according to the sliding of the link.

3. The docking station according to claim 2, further comprising:
   a lock hole provided in the case and allowing a lock member of a Kensington lock to enter and exit the lock hole; and
   a rib extended from one side of the link toward the lock hole and opening/closing the lock hole according to the sliding of the link.

4. The docking station according to claim 2, wherein the link comprises:
   a pair of lift slopes inclined along a sliding direction of the link and slidably contacting the corresponding lift parts to allow the lift parts to ascend and descend; and
   a pair of holder slopes inclined across the sliding direction of the link and slidably contacting the corresponding holder parts to move the holder parts forward and backward.

5. The docking station according to claim 4, further comprising:
   a lock hole provided in the case and allowing a lock member of a Kensington lock to enter and exit the lock hole; and
   a rib extended from one side of the link toward the lock hole and opening/closing the lock hole according to the sliding of the link.

6. The docking station according to claim 4, wherein each of the holder parts comprises:
   a rod to move forward and backward, abutting the corresponding holder slope;
   a hook bent from an end part of the rod to be extended and coupled to and uncoupled from the computer body; and
   an auxiliary spring elastically biasing the rod, wherein one end part of the auxiliary spring is supported by the rod and the other end part thereof is supported by one side of the case.

7. The docking station according to claim 6, further comprising:
   a lock hole provided in the case and allowing a lock member of a Kensington lock to enter and exit the lock hole; and
   a rib extended from one side of the link toward the lock hole and opening/closing the lock hole according to the sliding of the link.

8. The docking station according to claim 1, wherein the rotating part comprises:
   a rotation shaft; and
   a lever rotatably coupled to the rotation shaft and abutting an end of the link to slide the link.

9. The docking station according to claim 8, further comprising:
   a lock hole provided in the case and allowing a lock member of a Kensington lock to enter and exit the lock hole; and
   a rib extended from one side of the link toward the lock hole and opening/closing the lock hole according to the sliding of the link.

10. The docking station according to claim 1, further comprising:
    a lock hole provided in the case and allowing a lock member of a Kensington lock to enter and exit the lock hole; and
    a rib extended from one side of the link toward the lock hole and opening/closing the lock hole according to the sliding of the link.

11. A notebook computer having a detachable docking station, comprising:
a the notebook computer having a computer body;
a the docking station detachably mounted on the computer body and cooperating with the computer body, wherein the docking station comprises:
a a case;
a pair of detachable parts disposed in opposite sides of the case and allowing the case to be coupled to or detached from the computer body;
a link slidably installed in the case and sliding in contact with the pair of detachable parts; and
a rotating part rotatably coupled to the case and adhering closely to one end part of the link to slide the link.

12. The notebook computer according to claim 11, further comprising:
a Kensington lock having a lock member; and
a lock hole provided in the case and allowing the lock member of the Kensington lock to come in and out;
a rib extended from one side of the link toward the lock hole and opening/closing the lock hole according to the sliding of the link.

13. The notebook computer according to claim 12, wherein each of the detachable parts comprises:
a lift part ascending/descending to press/release from the computer body according to a sliding of the link; and
a holder part moving forward and backward to be coupled to and uncoupled from the computer body according to the sliding of the link.

14. The notebook computer according to claim 13, wherein the link comprises:
a pair of lift slopes inclined along the sliding direction of the link and slidably contacting the corresponding lift parts to allow the lift parts to ascend and descend; and
a pair of holder slopes inclined across the sliding direction of the link and slidably contacting the corresponding holder parts to move the holder parts forward and backward.

15. The notebook computer according to claim 14, wherein the holder part comprises:
a rod to move forward and backward, abutting the corresponding holder slope;
a hook bent from an end part of the rod to be extended and coupled to and uncoupled from the computer body; and
a an auxiliary spring elastically biasing the rod, wherein one end part of the auxiliary spring is supported by the rod and the other end part thereof is supported by one side of the case.

16. The notebook computer according to claim 15, wherein when the computer body is mounted on the docking station with the docking station locked by the Kensington lock, the hook slides by an elastic force of the auxiliary spring, and the computer body is mounted on the docking station.

17. The notebook computer according to claim 11, wherein the rotating part comprises:
a rotation shaft; and
a lever rotatably coupled to the rotation shaft and adhering closely to an end of the link to slide the link.

18. A docking station case comprising:
a pair of detachable parts, opposite one another inside the docking station case;
a slidable link, located between the detachable parts and parallel to a side of the docking station case, to move the detachable parts to attach/detach a computer body; and
a rotatable part, rotatably coupled to the docking station case and abutting the slidable link, to slide the slidable link.

19. The docking station case of claim 18, further comprising:
a lock hole provided in the docking station case and allowing a lock member of a Kensington lock to enter and exit the lock hole; and
a rib extended from one side of the slidable link toward the lock hole and opening/closing the lock hole according to the sliding of the slidable link.

20. The docking station case of claim 18, wherein each of the detachable parts comprises:
a lift part ascending/descending to press/release from the computer body using the slidable link; and
a holder part moving forward and backward to be coupled to and uncoupled from the body of the computer, using the slidable link.

21. The docking station case of claim 20, further comprising:
a lock hole provided in the case and allowing a lock member of a Kensington lock to enter and exit the lock hole; and
a rib extended from one side of the link toward the lock hole and opening/closing the lock hole according to the sliding of the link.

22. The docking station case of claim 20, wherein the slidable link comprises:
a pair of lift slopes inclined along a sliding direction of the slideable link and slidably contacting the corresponding lift parts to allow the lift parts to ascend and descend; and
a pair of holder slopes inclined across the sliding direction of the link and slidably contacting the corresponding holder parts to move the holder parts forward and backward.

23. The docking station case of claim 22, further comprising:
a lock hole provided in the case and allowing a lock member of a Kensington lock to enter and exit the lock hole; and
a rib extended from one side of the link toward the lock hole and opening/closing the lock hole according to the sliding of the link.

24. The docking station case of claim 22, wherein each of the holder parts comprises:
a rod to move forward and backward, abutting the holder slope;
a hook bent from an end part of the rod to be extended and coupled to and uncoupled from the computer body; and
a an auxiliary spring elastically biasing the rod, wherein one end part of the auxiliary spring is supported by the rod and the other end part thereof is supported by one side of the case.

25. The docking station case of claim 24, further comprising:
a lock hole provided in the case and allowing a lock member of a Kensington lock to enter and exit the lock hole; and
a rib extended from one side of the link toward the lock hole and opening/dosing the lock hole according to the sliding of the link.

26. The docking station case of claim 24, wherein the rotating part comprises:

a rotation shaft; and a lever rotatably coupled to the rotation shaft and abutting an end of the link to slide the link.

27. The docking station case of claim 26, further comprising:

a lock hole provided in the case and allowing a lock member of a Kensington lock to enter and exit the lock hole; and a rib extended from one side of the link toward the lock hole and opening/closing the lock hole according to the sliding of the link.

28. A docking station case comprising:

a rotatable part, rotatably coupled to the docking station case and abutting an automatic hooking unit; and a the automatic hooking unit, arranged to hook/unhook a bottom of a computer body upon rotation of the rotatable part.

29. The docking station case of claim 28, wherein the automatic hooking unit comprises:

a pair of detachable parts, opposite one another inside the docking station case; and a slidable link, located between the detachable parts and parallel to a side of the docking station case, to move the detachable parts to hook/unhook the bottom of the computer body.

30. The docking station case of claim 29, further comprising:

a lock hole provided in the case and allowing a lock member of a Kensington lock to enter and exit the lock hole; and a rib extended from one side of the link toward the lock hole and opening/closing the lock hole according to the sliding of the link.

31. The docking station case of claim 28, wherein each of the detachable parts comprises:

a lift part ascending/descending to press/release from the bottom of the computer body using the slidable link; and a holder part moving forward and backward to be hooked to and unhooked from the bottom of the computer body, using the slidable link.

32. The docking station case of claim 31, further comprising:

a lock hole provided in the case and allowing a lock member of a Kensington lock to enter and exit the lock hole; and a rib extended from one side of the link toward the lock hole and opening/closing the lock hole according to the sliding of the link.

33. The docking station case of claim 31, wherein the slidable link comprises:

a pair of lift slopes inclined along a sliding direction of the slideable link and slidably contacting the corresponding lift parts to allow the lift parts to ascend and descend; and a pair of holder slopes inclined across the sliding direction of the link and slidably contacting the corresponding holder parts to move the holder parts forward and backward.

34. The docking station case of claim 33, further comprising:

a lock hole provided in the case and allowing a lock member of a Kensington lock to enter and exit the lock hole; and a rib extended from one side of the link toward the lock hole and opening/closing the lock hole according to the sliding of the link.

35. The docking station case of claim 33, wherein each of the corresponding holder parts comprises:

a rod to move forward and backward, abutting the holder slope;

a hook bent from an end part of the rod to be extended and coupled to and uncoupled from the computer body; and a an auxiliary spring elastically biasing the rod, wherein one end part of the auxiliary spring is supported by the rod and the other end part thereof is supported by one side of the case.

36. The docking station case of claim 35 wherein the rotating part comprises:

a rotation shaft; and a lever rotatably coupled to the rotation shaft and abutting an end of the link to slide the link.

37. The docking station case of claim 35, further comprising:

a lock hole provided in the case and allowing a lock member of a Kensington lock to enter and exit the lock hole; and a rib extended from one side of the link toward the lock hole and opening/closing the lock hole according to the sliding of the link.

38. The docking station case of claim 28, further comprising:

a lock hole provided in the docking station case and allowing a lock member of a Kensington lock to enter and exit the lock hole; and a rib extended from one side of the slidable link toward the lock hole and opening/closing the lock hole according to the sliding of the slidable link.

39. A docking station case comprising:

a pair of detachable parts, opposite one another inside the docking station case;

a slidable link, located between the detachable parts and parallel to a side of the docking station case, to move the detachable parts to attach/detach a computer body; and a lever, rotatably coupled to the docking station case and abutting the slidable link, to slide the slidable link to lock the computer body to the docking station.

40. A theft/loss prevention mechanism in a docking station case-computer body combination, comprising:

a lever, abutting a slidable locking mechanism; and a the slidable locking mechanism, slidably attached to the docking station case and arranged to engage the computer body upon rotation of the lever.

41. The theft/loss prevention mechanism of claim 40, wherein the slidable locking mechanism comprises:

a pair of detachable parts, opposite one another inside the docking station case; and a slidable link, located between the detachable parts and parallel to a side of the docking station case, to move the detachable parts to hook/unhook the bottom of the computer body.

* * * * *

UNITED STATES PATENT AND TRADEMARK OFFICE
CERTIFICATE OF CORRECTION

PATENT NO. : 6,898,079 B2
APPLICATION NO. : 10/374722
DATED : May 24, 2005
INVENTOR(S) : Woo-nam Park It is certified that error appears in the above-identified patent and that said Letters Patent is hereby corrected as shown below:

Column 9, line 3, change "a the" to --the--.

Column 9, line 4, change "a the docking" to --the docking--.

Column 9, line 7, change "a case" to --case--.

Column 9, line 46, change "a an" to --an--.

Column 10, line 54, change "a an" to --an--.

Column 10, line 64, change "dosing" to --closing--.

Column 11, line 16, change "a the" to --the--.

Column 12, line 11, change "a an" to --an--.

Column 12, line 16, insert --,-- before "wherein".

Column 12, line 54, change "a the slidable" to --the slidable--.

Signed and Sealed this

Eighth Day of August, 2006

JON W. DUDAS
*Director of the United States Patent and Trademark Office*